United States Patent Office 3,431,596
Patented Mar. 11, 1969

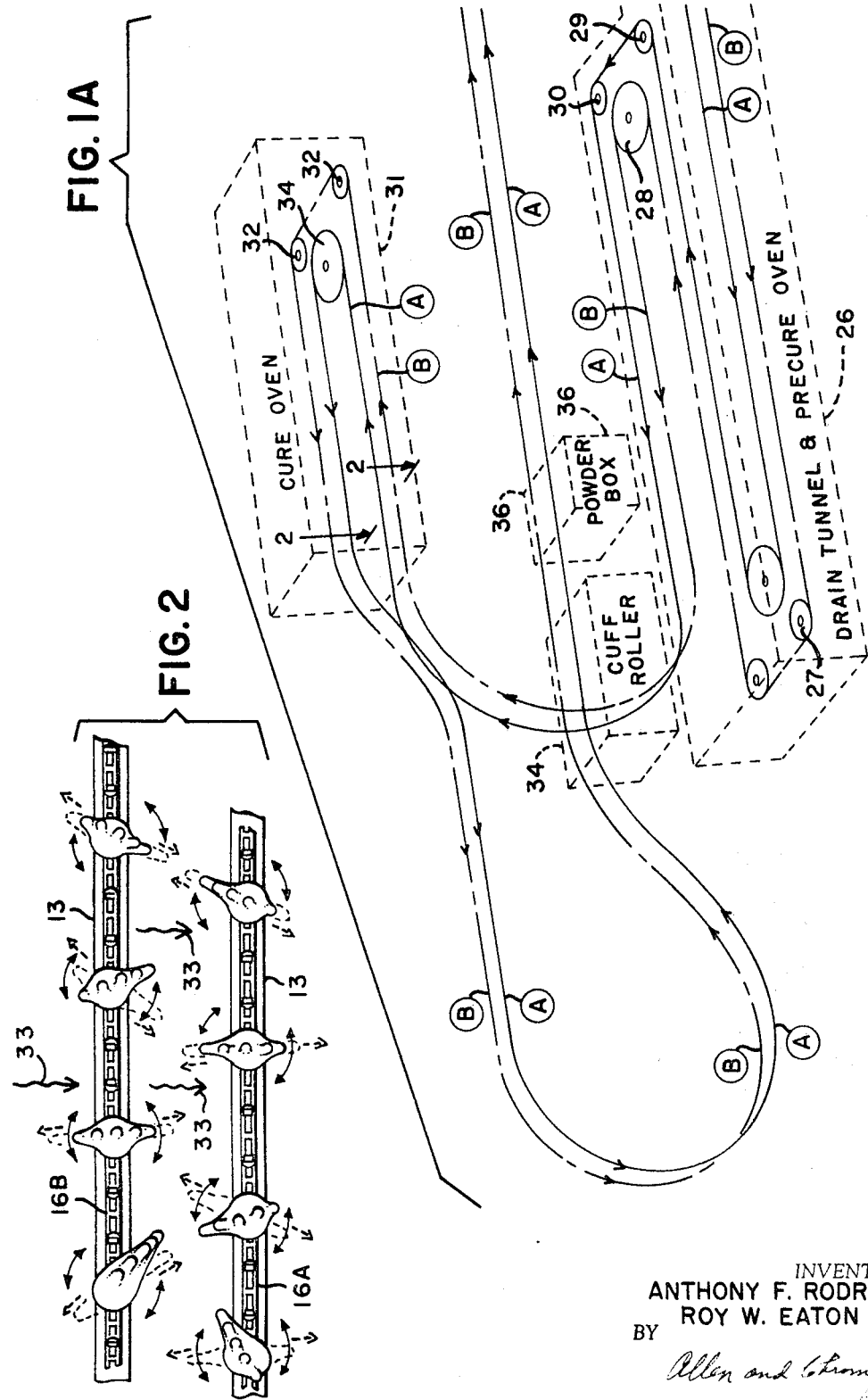

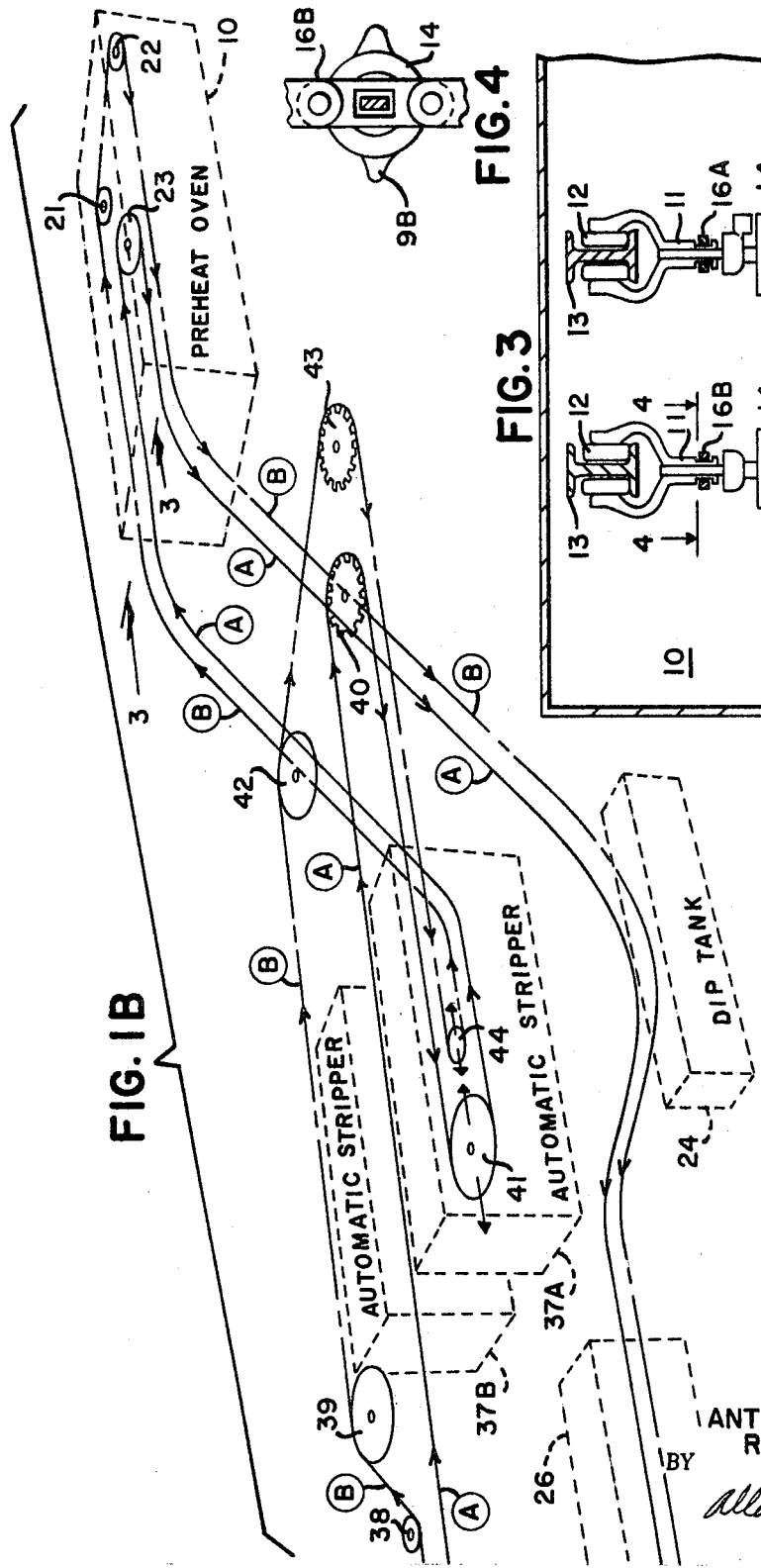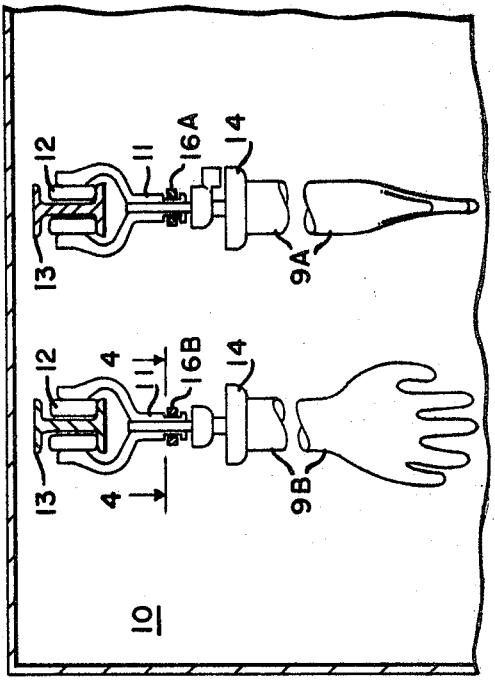

3,431,596
DIP MOLDING APPARATUS—DOUBLE
CONVEYOR
Anthony F. Rodrigues, Santa Clara County, and Roy W. Eaton, Campbell, Calif., assignors to Becton, Dickinson of California, Inc., Los Gatos, Calif., a corporation of California
Filed Mar. 27, 1967, Ser. No. 626,274
U.S. Cl. 18—4                                                  4 Claims
Int. Cl. B29c 13/00

ABSTRACT OF THE DISCLOSURE

A dip molding apparatus employs two parallel independently driven conveyors with respective series of molds thereon passing simultaneously through a series of processing stations to provide increased capacity. At certain stations the two conveyors are separated so that the respective series of molds are treated separately and at other stations the conveyors are relatively close together and the respective series of molds are treated simultaneously. At stations requiring access to the molds of both series from a side, the respective series of molds of the two conveyors are offset with respect to the length of the path to allow such access.

Description of invention

In the manufacture of thin molded plastic articles provided by dip molding apparatus, for example, the usual practice is to move a single conveyor through a series of stations and the single conveyor usually carries a seires of spaced-apart molds through a succession of processing stations where various operations are performed. In certain dip molding apparatus, a plurality of transversely spaced molds are provided in parallel side-by-side relation on a single conveyor so as to be treated simultaneously as they pass through the processing stations. In accordance with our invention, a pair of independently driven conveyors are provided which are carried through the various processing stations and their paths are so controlled with respect to series of molds thereon so as to place the molds of one series in alternating relation with respect to the molds of another series in certain locations so that they can be treated or subjected to treating operations simultaneously from both sides as is desirable at certain of the processing stations. This results in not only providing a greater capacity for a given apparatus but provides the desirable exposure of both sides of a mold for treatment in passing through stations where this is necessary.

It is accordingly a general object of the invention to provide a processing apparatus such as a dip molding apparatus in which maximum use of the available floor space is provided by employing a plurality of conveyors for respective series of molds.

A further object of the invention is to provide means where apparatus employing an existing single conveyor with a series of molds thereon can be adapted to use a second conveyor with a second series of molds thereon without interfering with each other in being carried through the various processing stations and provide, in effect, both sides of both series of molds for access in certain of the stations.

Other objects and advantages of the invention will be apparent from the following description of a preferred embodiment thereof, taken in connection with the accompanying drawings, in which:

FIGS. 1A and 1B together show schematically a dip molding apparatus employing the instant invention;

FIG. 2 is a fragmentary plan view, with certain parts omitted, being taken as indicated by the line 2—2 in FIG. 1;

FIG. 3 is a transverse sectional view taken in the plane indicated by the line 3—3 in FIG. 1B, and illustrating in detail the adjacent parallel conveyor constructions;

FIG. 4 is a fragmentary sectional view taken as indicated by the line 4—4 in FIG. 3;

FIG. 5 is a diagram illustrating the relation of FIGS. 1A and 1B.

Referring to the FIGS. 1A and 1B the respective parallel conveyors A and B are provided, which extend along an endless path and carry respective series of molds which are not illustrated in FIGS. 1A and 1B. The mold construction is illustrated in FIGS. 2 and 3 where it is seen that a mold 9A or 9B is supported in projecting fashion from an overhead I-beam track 13 and they are engaged with and driven by respective conveyors or chains 16A and 16B. The chains 16A and 16B and the I-beam tracks 13 provide mounting and positioning means for the series of molds and serve to determine the path through which each series of molds is carried. The two conveyors A and B are driven to carry the molds of the respective series through an endles path along which are disposed certain processing stations where the various necessary and/or desirable operations are performed by the molds and the processing stations to provide a dip-molded plastic product.

As a first operation the molds are subjected to a preheating in a first station or preheating oven 10 to be prepared for a subsequent dipping operation, the molds being heated to a desired temperature below that of the jelling temperature of a plastic so as to provide the desired run-off from the molds, after being coated with plastic. As seen in FIG. 3, in the preheat oven 10 each series of molds 9A or 9B are rotatably mounted on a mold carrier 11 which is bifurcated at the top and carries a pair of rollers 12 engaging on opposite sides of an I-beam 13 which is suitably secured to the top wall of the preheat oven 10. Adjacent to the top of each mold 9A or 9B there is provided a cylindrical portion 14 which may be engaged by a stationary member extending along the track to effect rotation of the mold on its carrier in a conventional manner.

The shape of the track of the molds is provided by bending of the channel 13 to the desired configuration, and this is indicated schematically in FIGS. 1A and 1B. In passing through the preheat oven 10, it will be seen that the conveyor B passes through a longer U-shaped path or turn in the oven and is guided around respective turn wheels 21 and 22 which encompass or straddle the path of the conveyor A around the single turn wheel 23 which is disposed between the stretches of the conveyor B.

In the particular illustration shown, the preheat oven 10 (FIG. 1A) is in elevated position to conserve floor space, and the two conveyors A and B descend therefrom to cause the molds carried thereby to pass through the solution in the dip tank 24. From the dip tank 24 the two mold conveyors extend upwardly and into one side of a combined drain tunnel and precure oven 26 (FIG. 1B) where the conveyor B is carried around respective turn wheels 27 at one end of the casing of the station 26 and a turn wheel 28 at the other. The conveyor A extends around respective turn wheels 29 and 30. In this station, the molds are subjected to a temperature which will cause a slight pre-jelling of the plastic to get the desired consistency thereof for coat thickness and the final curing.

After the conveyors A and B pass from the drain tunnel and precure oven 26 they pass over an upwardly extending and reversely curved track portion leading to the cure oven 31. The molds are inverted and rotated during such inversion as disclosed in the Abildgaard et al. Patent No. 3,117,341 issued Jan. 14, 1964, so that they pass through the cure oven 31 with the molds projecting upwardly and being rotated while passing through the cure oven by suitable means. In this cure oven, the conveyor B passes around respective turn wheels 32 while the conveyor A passes around a turn wheel 34 disposed between the turn wheels 32. While the molds are in the inverted position in the cure oven as shown in FIG. 2, they are in alternating relation on their respective conveyors so that the molds of both series as seen in FIG. 2 are exposed directly to the curing atmosphere from one side as indicated by the arrows 33. After leaving the cure oven 31, the respective conveyors A and B again extend through a downwardly and reversely curved return path to pass into a cuff rolling station 34 and thence to a powder station 36. At the station 36 the molds are again controlled to be in alternating or staggered relation with respect to each other so as to be exposed to the powder when projected against them from either side. From the powder station 36, the conveyors A and B extend in their closest spaced-apart relation until they arrive at separate stripping stations 37A, 37B which require access to each mold separately for the entire circumference thereof and correspondingly conveyors A and B are spaced widely apart at this location.

After the stripping stations 37A and 37B, the conveyor A passes around a turn and drive sprocket 40, an adjustably mounted turn wheel 41, and thence back to the preheat oven. Correspondingly conveyor B passes around a turn wheel 42, a turn and drive sprocket 43, back around an adjustably mounted turn wheel 44 and thence back to the preheat oven. The turn wheels 41 and 44 are adjustably mounted to enable take-up of slack in the conveyor chains as may be required. The drive sprockets 40 and 43 are suitably connected to conventional drive means so that the two conveyors are driven in synchronism throughout their travel.

While we have shown and described a preferred embodiment of the invention, it is apparent that the invention is capable of variation and modification from the form shown so that the scope thereof should be limited only by the proper scope of the claims appended hereto.

We claim:

1. In an automatic molding apparatus for large volume production of molded articles from a solution such as a plastisol; a pair of substantially parallel conveyors extending in side-by-side relation along an endless path, a series of molds rotatably mounted on each of said conveyors, said molds of said respective series alternating in position lengthwise of said conveyors along certain of the parallel stretches of said conveyors, a series of processing stations along said path, certain of said stations including means for applying a heating medium from a side of said path to molds of both of said series, means located at at least one of said stations for rotating molds passing therethrough, and mounting and positioning means for said conveyors, said mounting and positioning means being located at said one station to provide a close spacing apart of said conveyors to provide for common treatment of the respective series of molds passing therethrough, and said mounting and positioning means at another of said stations providing a wider spacing apart of said conveyor and the molds thereon for separate operations on said respective series of molds by separate means.

2. In an automatic molding apparatus as recited in claim 1 in which said stations include in sequence in said series a plastisol applying station in which the molds are coated with the plastisol to provide a film thereon, a curing station at which the film on the molds is cured, and a stripping station at which the articles are stripped from the molds, said stripping station comprising said other station.

3. In an automatic molding apparatus as recited in claim 1 in which said stations include in sequence in said series a plastisol applying station in which the molds are coated with the solution to provide a film thereon, a curing station at which the film on the molds is cured, and a stripping station at which the articles are stripped off the molds, said curing station comprising said one station.

4. In an automatic molding apparatus as recited in claim 1 in which a station is located at a turn portion of said path and in which said mounting and positioning means for one of said conveyors comprises a centrally disposed turn guide means spaced from the turn end of said path, and in which said mounting and positioning means for said other conveyor comprises a pair of spaced apart turn and guide means for said conveyor of a wider spacing and straddling said first named turn and guide means for said first conveyor.

References Cited

UNITED STATES PATENTS

| 1,991,118 | 2/1935 | Raiche | 18—24 |
| 2,299,269 | 10/1942 | Gammeter | 18—24 XR |
| 2,694,830 | 11/1954 | Pollock | 18—24 XR |
| 2,712,161 | 7/1955 | Moss | 18—24 XR |
| 3,278,991 | 10/1966 | Peternell et al. | 18—24 |

WILLIAM J. STEPHENSON, Primary Examiner.

U.S. Cl. X.R.

18—24